US012775933B2

(12) United States Patent
Durant et al.

(10) Patent No.: US 12,775,933 B2
(45) Date of Patent: Oct. 27, 2026

(54) SYSTEMS AND METHODS FOR GENERATING AN IMAGE FOR A PAYMENT DEVICE

(71) Applicant: Fidelity Information Services, LLC, Jacksonville, FL (US)

(72) Inventors: George S. Durant, Saline, MI (US); Eric Bond, Whitefish Bay, WI (US); Gary Duma, Royal Oak, MI (US)

(73) Assignee: Fidelity Information Services, LLC, Jacksonville, FL (US)

( * ) Notice: Subject to any disclaimer, the term of this patent is extended or adjusted under 35 U.S.C. 154(b) by 127 days.

(21) Appl. No.: 18/494,930

(22) Filed: Oct. 26, 2023

(65) Prior Publication Data

US 2025/0139609 A1 May 1, 2025

(51) Int. Cl.

*G06Q 20/34* (2012.01)
*G06T 3/40* (2006.01)
*G06T 11/60* (2026.01)
*G06F 3/0482* (2013.01)

(52) U.S. Cl.

CPC ........... *G06Q 20/3558* (2013.01); *G06T 3/40* (2013.01); *G06T 11/60* (2013.01); *G06F 3/0482* (2013.01); *G06F 2203/04806* (2013.01); *G06T 2200/24* (2013.01)

(58) Field of Classification Search

CPC ....... G06T 3/40; G06T 2200/24; G06T 11/60; G06F 3/0482; G06F 2203/04806; G06Q 20/3558; G06Q 20/355

See application file for complete search history.

(56) References Cited

U.S. PATENT DOCUMENTS

| | | | | |
|---|---|---|---|---|
| 10,101,891 | B1 * | 10/2018 | Kulewski | G06F 3/04845 |
| 2007/0268523 | A1 | 11/2007 | Ferrara et al. | |
| 2008/0313205 | A1 * | 12/2008 | Elgar | G07F 7/08 358/1.6 |
| 2015/0371219 | A1 | 12/2015 | Ljujic | |
| 2017/0024087 | A1 * | 1/2017 | Pathy | H04L 51/10 |
| 2017/0124586 | A1 * | 5/2017 | Tepper | G06Q 30/0217 |

(Continued)

FOREIGN PATENT DOCUMENTS

CN 116485504 A 7/2023

OTHER PUBLICATIONS

International Search Report of International Application No. PCT/US2024/052975 mailed on Feb. 3, 2025, 3 pages.

(Continued)

*Primary Examiner* — Phi Hoang
(74) *Attorney, Agent, or Firm* — Bookoff McAndrews, PLLC

(57) ABSTRACT

A method for generating a user-designed image for applying to a payment card includes receiving at least one image criterion of a target image associated with a user associated with a payment card, receiving a plurality of preliminary images generated by an artificial intelligence engine based on the at least one image criterion, receiving an image selection by the user, the image selection including an image selected from the plurality of preliminary images, displaying on a user interface the selected image superimposed on a virtual representation of the payment card, and setting at least one dimensional parameter of the selected image to suit a size of the payment card.

20 Claims, 11 Drawing Sheets

(56) References Cited

U.S. PATENT DOCUMENTS

| | | | | |
|---|---|---|---|---|
| 2019/0251612 A1* | 8/2019 | Fang | .................. | G06Q 30/0643 |
| 2019/0325496 A1* | 10/2019 | Schurkin | ............ | G06Q 20/3558 |
| 2022/0392171 A1* | 12/2022 | Baughman | ............ | G06T 19/006 |
| 2023/0334720 A1* | 10/2023 | Mene | ...................... | G06T 11/00 |
| 2023/0334827 A1* | 10/2023 | Truong | ..................... | G06F 3/14 |
| 2024/0127492 A1* | 4/2024 | Jayaraman | ............. | G06Q 50/04 |
| 2024/0193581 A1* | 6/2024 | Jayaraman | ............. | G06N 20/00 |
| 2024/0265274 A1* | 8/2024 | Parasnis | .................. | G06F 40/30 |
| 2024/0320867 A1* | 9/2024 | Bean | ..................... | G06F 16/532 |
| 2025/0246018 A1* | 7/2025 | Mahadevan | ......... | G06V 30/414 |

OTHER PUBLICATIONS

Liu Vivian et al: "3DALL-E: Integrating Text-to-Image AI in 3D Design Workflows", Proceedings of the 2023 ACM Designing Interactive Systems Conference, Oct. 20, 2022 (Oct. 20, 2022), pp. 1955-1977, XP093111873,New York, NY, USA.

Mina Huh et al: "GenAssist: Making Image Generation Accessible", arxiv.org, Cornell University Library, 201OLIN Library Cornell University Ithaca, NY 14853, Jul. 14, 2023 (Jul. 14, 2023), XP091564262.

* cited by examiner

SYSTEMS AND METHODS FOR GENERATING AN IMAGE FOR A PAYMENT DEVICE

TECHNICAL FIELD

The present disclosure relates generally to the field of payment devices, and, more particularly, to systems and methods for generating an image for a payment card.

BACKGROUND

Credit cards, debit cards, and similar payment devices are ubiquitous in the modern marketplace due to their convenience, security, other benefits provided to users and merchants. Because such payment cards are increasingly replacing the use of cash, many people handle their payment cards multiple times a day. As such, it may be advantageous and desirable for payment cards to include an image that makes the card readily identifiable, or simply pleasing to, the user. Currently, some card issuers allow a degree of personalization of payment cards by allowing users to select from a set of stock images, or by allowing users to upload their own image for use on the card. However, these solutions have drawbacks. In the case of using stock images, the subject matter is inherently limited and it can be difficult for users to find an image to which they feel a connection. Systems that allow users to upload their own images are often clumsy, and may encounter file type incompatibilities. Further, conventionally sized photographs (e.g., those taken from a smart phone) may not be dimensionally suitable to the size of the payment card. Additionally, some users may desire a unique or whimsical image that cannot be found in either a collection of stock images or within the user's own collection of images.

The present disclosure is directed to systems and methods addressing these and other drawbacks in the existing payment card field. The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment of the present disclosure is directed to a method for generating a user-designed image for applying to a payment card. The method includes receiving, by at least one processor, at least one image criterion of a target image associated with a user associated with a payment card, receiving, by at least one processor, a plurality of preliminary images generated by an artificial intelligence engine based on the at least one image criterion, receiving, by at least one processor, an image selection by the user, the image selection including an image selected from the plurality of preliminary images, displaying, by at least one processor on a user interface, the selected image superimposed on a virtual representation of the payment card, and setting, by at least one processor, at least one dimensional parameter of the selected image to suit a size of the payment card.

Another embodiment of the present disclosure is directed to a computer system for generating a user-designed image for applying to a payment card. The computer system includes at least one memory having processor-readable instructions stored therein, and at least one processor configured to access the memory and execute the processor-readable instructions. When executed by the processor, the instructions configure the processor to perform a plurality of functions, including functions for receiving at least one image criterion of a target image associated with a user associated with a payment card, receiving a plurality of preliminary images generated by an artificial intelligence engine based on the at least one image criterion, receiving an image selection by the user, the image selection including an image selected from the plurality of preliminary images, displaying, on a user interface, the selected image superimposed on a virtual representation of the payment card, and setting at least one dimensional parameter of the selected image to suit a size of the payment card.

Yet another embodiment of the present disclosure is directed to a non-transitory computer-readable medium storing instructions for applying to a payment card. The non-transitory computer-readable medium stores instructions that, when executed by at least one processor, configure the at least one processor to perform receiving at least one image criterion of a target image associated with a user associated with a payment card, receiving a plurality of preliminary images generated by an artificial intelligence engine based on the at least one image criterion, receiving an image selection by the user, the image selection including an image selected from the plurality of preliminary images, displaying, on a user interface, the selected image superimposed on a virtual representation of the payment card, and setting at least one dimensional parameter of the selected image to suit a size of the payment card.

BRIEF DESCRIPTION OF THE DRAWINGS

The accompanying drawings, which are incorporated in and constitute a part of this specification, illustrate several embodiments and together with the description, serve to explain the principles of the disclosure.

DETAILED DESCRIPTION OF EMBODIMENTS

Figure 1:
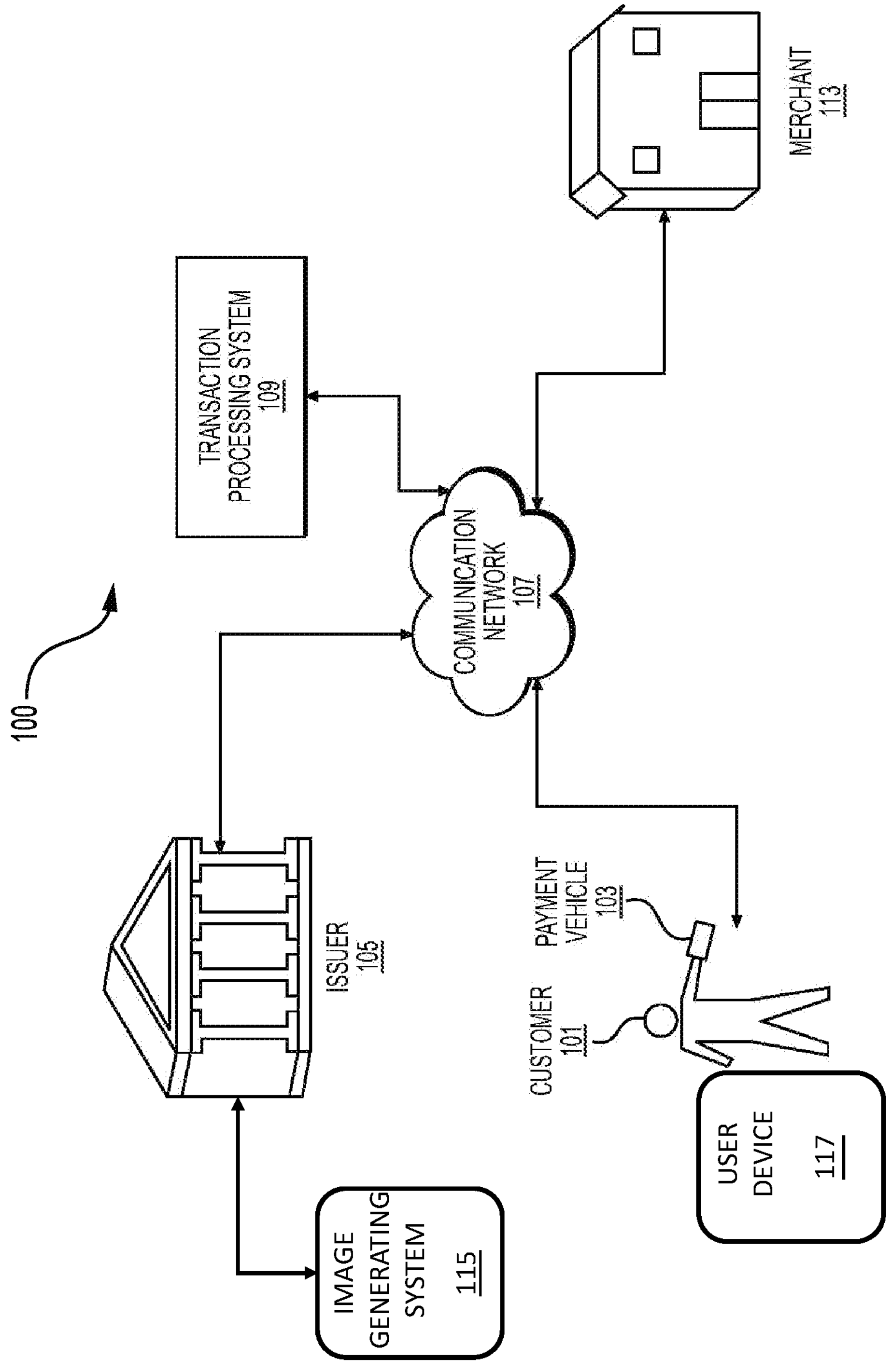
FIG. 1 depicts an exemplary financial transaction system incorporating generation and use of a payment device, according to one or more embodiments.

The following embodiments describe systems and methods for generating an image for a payment device, such as a credit card, debit card, or the like. More particularly, embodiments described in the present disclosure may enable users/customers to personalize a payment device by selecting an image generated from an artificial intelligence engine based on text input provided by the user/customer.

Embodiments of the present disclosure allow card issuers to leverage artificial intelligence technology to allow users/customers to personalize the image on payment devices with essentially unlimited capability. Further, embodiments of the present disclosure are robust in that each generated image is dimensionally suitable for use on a payment card. The ability to personalize payment cards according to the systems and methods of the present disclosure may attract customers to open an account with an issuer, thus providing a benefit to both customers and issuers.

As discussed above, existing systems and methods for image customization involve certain drawbacks and deficiencies such as a limited selection of stock images and/or incompatibility with image properties (e.g., size, resolution, and file type) of user-uploaded images. To address these and other problems, the present disclosure describes systems and methods that allow users/customers to generate unique images based on text input using an artificial intelligence engine. Further, the described systems and methods provide for automatic setting of the position of the image on the payment card to suit the size of the card, subject matter of the image, and/or other considerations. Still further, the described systems and methods provide for user-defined adjustments to the layout of the image on the payment card.

The subject matter of the present disclosure will now be described more fully hereinafter with reference to the accompanying drawings, which form a part hereof, and which show, by way of illustration, specific exemplary embodiments. An embodiment or implementation described herein as “exemplary” is not to be construed as preferred or advantageous, for example, over other embodiments or implementations; rather, it is intended to reflect or indicate that the embodiment(s) is/are “example” embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase “in one embodiment” or “in some embodiments” as used herein does not necessarily refer to the same embodiment and the phrase “in another embodiment” as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

FIG. 1 is a diagram of a financial transaction system 100 for settling payment between bank accounts associated with registered users, e.g., customer 101, and merchants, e.g., merchant 113, according to one example embodiment. More particularly, system 100 incorporates generation and use of a payment device. System 100 includes customer 101, payment vehicle 103, issuer 105, communication network 107, transaction processing system 109, database 111, merchant 113, image generating system 115, and user device 117.

Customer 101 may be an individual, a company, or other entity having one or more accounts with issuer 105. Customer 101 may generally have at least one payment vehicle 103 associated with a payment account with issuer 105. In one embodiment, customer 101 is a registered user for payment-related services with transaction processing system 109. Payment vehicle 103 may be a credit card, debit card, prepaid card, and/or the like. Payment vehicle 103 may be a traditional plastic transaction card, titanium-containing, or other metal-containing, transaction card, clear and/or translucent transaction card, foldable or otherwise unconventionally-sized transaction card, radio-frequency enabled transaction card, or other types of transaction card, such as debit, prepaid or stored-value cards, electronic benefit transfer card, charge, credit, or any other like financial transaction instrument.

Issuer 105 may be a bank that manages payment accounts on behalf of customer 101. For example, issuer 105 may hold an account for customer 101, and payment vehicle 103 may be affiliated with that account. In another embodiment, issuer 105 is the bank that manages recipient accounts on behalf of merchant 113. For example, issuer 105 may hold accounts for merchant 113, and merchant 113 may receive payments for the goods and services rendered in that account.

Various elements of system 100 may communicate with each other through communication network 107. Communication network 107 may support a variety of different communication protocols and communication techniques. In one embodiment, communication network 107 allows transaction processing system 109 to communicate with customer 101, issuer 105, and merchant 113. The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular communication network and may employ various technologies including 5G (5th Generation), 4G, 3G, 2G, Long Term Evolution (LTE), wireless fidelity (Wi-Fi), Bluetooth®, Internet Protocol (IP) data casting, satellite, mobile ad-hoc network (MANET), vehicle controller area network (CAN bus), and the like, or any combination thereof.

Transaction processing system 109 may be a platform with multiple interconnected components. Transaction processing system 109 may include one or more servers, intelligent networking devices, computing devices, components, and corresponding software for payment settlement between bank accounts associated with customer 101 and merchant 113 involved in a transaction. Transaction processing system 109 may verify the access credentials of customer 101 to authorize access to a payment-related service.

Merchant 113 may be a merchant offering goods and/or services for sale to customer 101. Merchant 113 may be equipped with a POS device (not shown), which is configured to receive payment information from payment vehicle 103 and to relay received payment information to transaction processing system 109. Merchant 113 can be any type of merchants, such as a brick-and-mortar retail location or an e-commerce/web-based merchant with a POS device or a web payment interface. In one embodiment, merchant 113 is registered with transaction processing system 109 for payment-related services.

Image generating system 115 may be owned by, contracted by, or otherwise affiliated with issuer 105 and may be configured to generate an image for payment vehicle 103. In particular, image generating system 115 is configured to generate the background image and/or artwork displayed on payment vehicle 103. Image generating system 115 may be accessible by customer 101 through an online portal affiliated with issuer 105. In some embodiments, image generating system 115 may be accessible to customer 101 during an account setup process with issuer 105, upon approval of an application for payment vehicle 103, and/or at other times over the course of the relationship between customer 101 and issuer 105. Image generating system 115 may perform various processes to generate an image, such as utilization of an artificial intelligence engine as will be described herein.

In some embodiments, image generating system 115 may include or be in communication with various third party services (not shown) that generate images based on inputs received from customer 101. Image generating system 115 may be accessed via user device 117 associated with customer 101.

User device 117 generally includes an input/output device (e.g., a touchscreen display, keyboard, monitor, etc.) enabling customer 101 to access and/or interact with other elements in the system 100. For example, user device 117 may be a computer system such as, for example, a desktop computer, a laptop computer, a server, a mobile device, a tablet, etc. In some embodiments, user device 117 may include one or more electronic application(s), e.g., a program, plugin, browser extension, etc., installed on a memory of user device 117. In some embodiments, the electronic application(s) may be associated with one or more of the other components in system 100. For example, the electronic application(s) may allow customer 101 to interact with image generating system 115.

Figure 2:
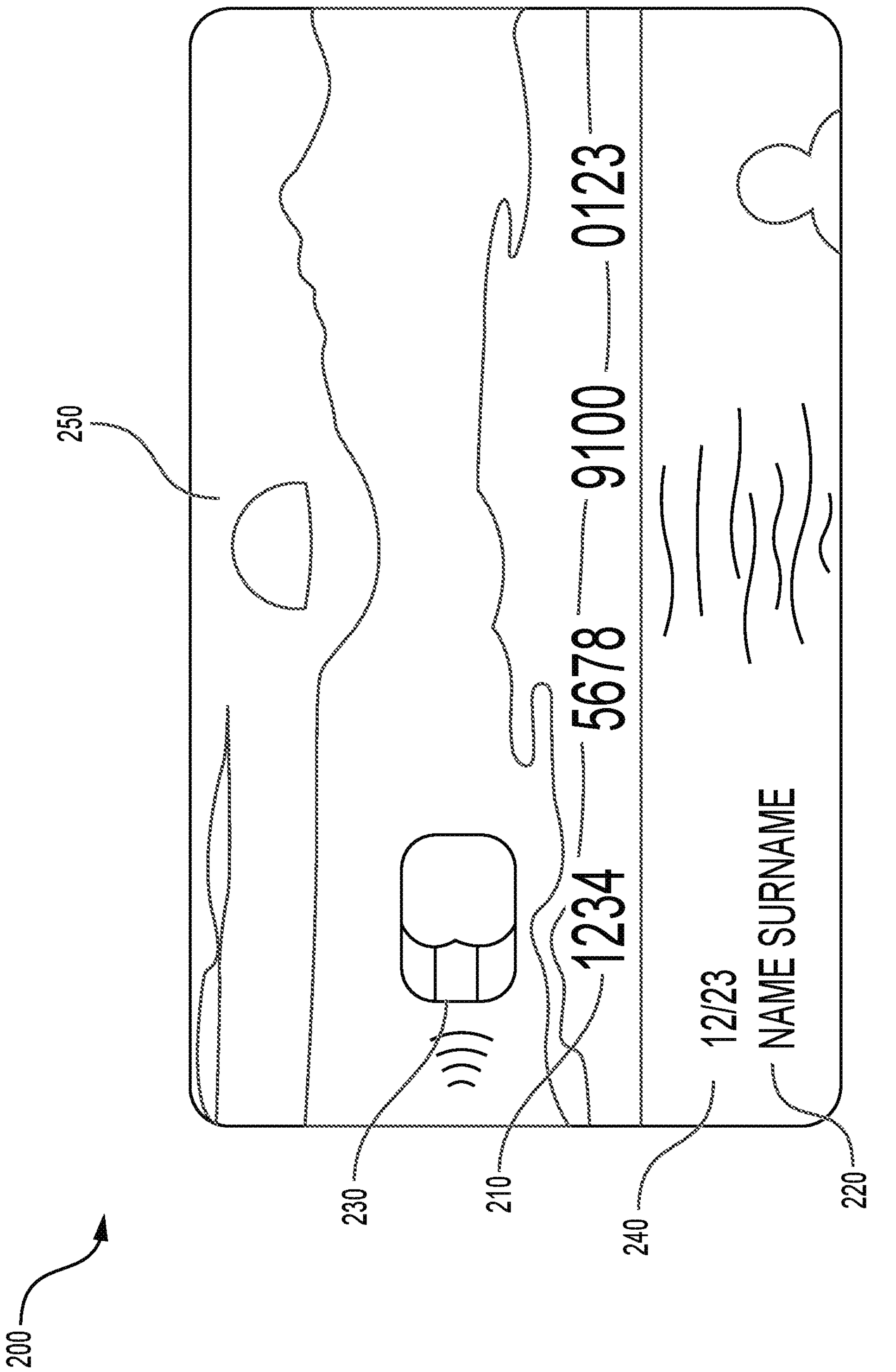
FIG. 2 is a front view of a payment device, according to one or more embodiments.

Referring now to FIG. 2, exemplary payment device 200 (such as payment vehicle 103 of FIG. 1) is illustrated. Payment device 200 may be used as a payment method to allow a cardholder (e.g., customer 101 of FIG. 1) to purchase goods and/or services from a merchant (e.g., merchant 113 of FIG. 1). Funds for the transaction may be obtained from a line of credit extended to the cardholder by an issuer (e.g., issuer 105 of FIG. 1) of the payment device 200, and/or from a bank account owned by the cardholder and maintained by the issuer of the payment device 200. Payment device 200 includes various identifying indicia such as account number 210 associated with the line of credit and/or bank account, and name 220 of the cardholder. Payment device 200 may further include chip 230 or other readable element allowing a reader/scanner of a merchant device (not shown) to communicate with the issuer of payment device 200 to verify that the cardholder has sufficient credit and/or funds to cover a purchase. Payment device 200 may further include an expiration date 240. Payment device 200 includes a background image 250 covering a portion or the entirety of payment device 200. In some embodiments, payment device 200 may be generally rectangular in shape, having a length of about 3.375 inches and a height of 2.125 inches, though other shapes and sizes are understood to be encompassed by the scope of the present disclosure.

Figure 3:
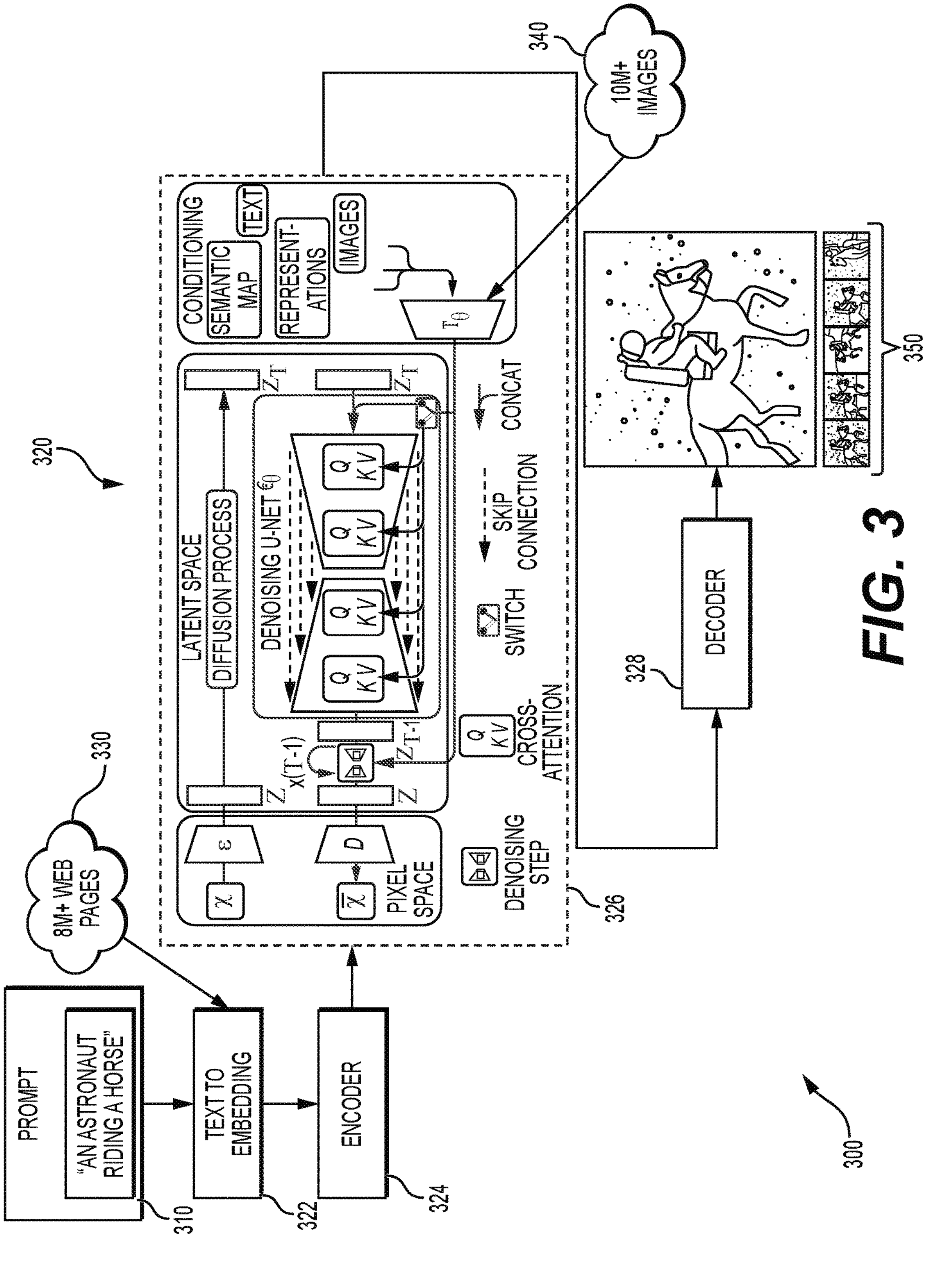
FIG. 3 is a schematic diagram of architecture of an artificial intelligence engine, according to one or more embodiments.

Referring now to FIG. 3, illustrated is an architecture 300 for generating an image, such as an image for payment vehicle 103 of FIG. 1 and/or payment device 200 of FIG. 2. Architecture 300 may be implemented by, for example, image generating system 115 of FIG. 1. Architecture 300 includes input module 310 that receives input from one or more sources. Input may include, for example, at least one image criterion defining properties of a target image desired by a user (e.g., customer 101). Input module 310 may be configured, for example, to receive text prompts input by the user into a user device (e.g., user device 117 of FIG. 1). In the illustrated example, the input includes the text "an astronaut riding a horse," which prompts architecture 300 to generate images including an astronaut riding a horse.

With continued reference to FIG. 3, architecture 300 further includes artificial intelligence module 320 that receives inputs from input module 310 and applies one or more artificial intelligence models 326 to the input to generate one or more images. In some embodiments, artificial intelligence module 320 may include an encoder-decoder architecture, as illustrated in FIG. 3, though other architectures may be utilized. Artificial intelligence module 320 includes embedding module 322 that generates embeddings from text from input module 310. Embedding module 322 may receive data from database 330. Data in database 330 may include a plurality of existing images from one or more sources, such as images from a plurality of web pages available on the Internet. Generally, the more data points from database 330 that are analyzed by embedding module 322, the more robust artificial intelligence module 320 becomes. For example, the use of more data points may allow embedding module 322 to increase the dimensionality of the generated embeddings. While database 330 may include images obtained from the Internet, other sources, such as a proprietary database of images, may also be used to form database 330.

With continued reference to FIG. 3, artificial intelligence module 320 further includes encoder 324 which generates a vector representation of the input from input module 310 based on the embedding generated by embedding module 322. Encoder 324 transmits the vector representation to one or more artificial intelligence models (AI model) 326. In some embodiments, AI model 326 includes a pixel and image diffusion model, though other models may be used additionally or alternatively thereto. In some embodiments, AI model 326 includes a pixel space and a latent space. AI model 326 may use a set of training images from external database 340 to generate new, unique images based on the input from input module 310. AI model 326 may perform various functions such as conditioning, de-noising, cross-attenuation, and the like to generate one or more images from the vector representation received from encoder 324.

With continued reference to FIG. 3, artificial intelligence module 320 further includes decoder 328 configured to output one or more images 350 based on the output of AI model 326. That is, each of images 350 includes the subject matter and any other properties provided by input module 310. Each of the images 350 is unique (i.e., generated for the first time by AI model 326).

In some embodiments, artificial intelligence module 320 may be a third party system such as DALL-E, DALL-E 2, or Stable Diffusion. Such systems may be accessed via an application programming interface (API) of a user device (e.g. user device 117 of FIG. 1) associated with customer 101 and/or issuer 105 of FIG. 1. Thus, the input for input module 310 may be entered via user device 117 of FIG. 1 and transmitted to third party artificial intelligence module 320 via an API. The one or more images 350 may be returned to the user device 117 via the API for further use and/or processing by customer 101 and/or issuer 105.

Figure 4:
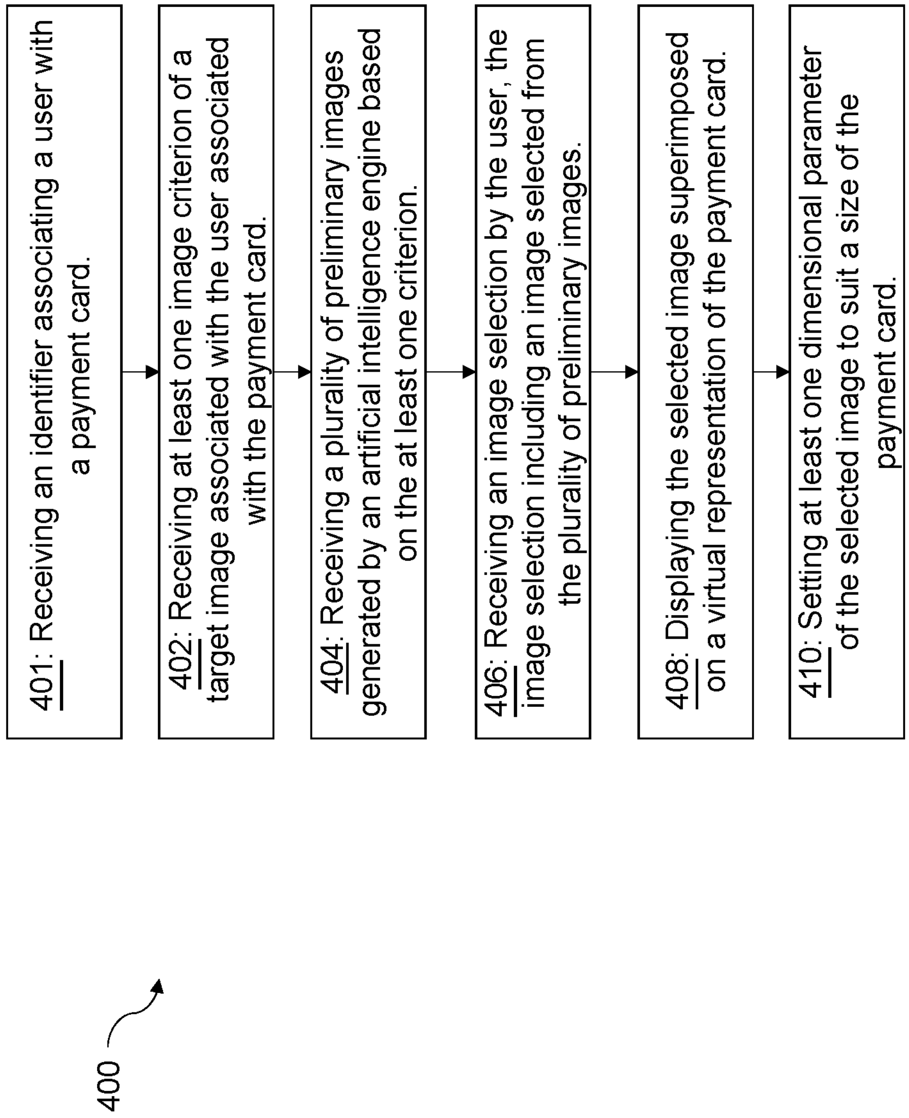
FIG. 4 illustrates a flowchart of an exemplary method for generating an image for a payment device, according to one or more embodiments.

Referring now to FIG. 4, illustrated is a flow diagram of method 400 for generating an image for a payment device, such as payment vehicle 103 of FIG. 1 and/or payment device 200 of FIG. 2. Each of steps 401-410 of method 400 may be performed automatically by at least one processor, such as included in controller 1100 (see FIG. 11) associated with image generating system 115 and/or user device 117. Various steps 401-410 of method 400 may include, or be performed in conjunction with, display of one or more user interfaces on user device 117. Accordingly, throughout the following description of method 400, reference is made to user interfaces 600, 620, 640, 660, 680 of FIGS. 6-10.

With continued reference to FIG. 4, method 400 includes, at step 401, receiving an identifier associating a user (e.g., customer 101 of FIG. 1) with a payment card (e.g., payment vehicle 103 of FIG. 1 and/or payment device 200 of FIG. 2). The identifier may include, for example, account number (e.g. account number 210 of FIG. 2) of the user, a user PIN, user login credentials, or other information that provides an affirmative association between the user and the payment card. By associating the user and payment card in this manner, subsequent steps of method 400 are associated with the particular payment card associated with the identifier.

With continued reference to FIG. 4, method 400 includes, at step 402, receiving at least one image criterion of a target image associated with the user associated with the payment card. In some aspects, the at least one image criterion includes one or more of subject matter of the target image, color scheme of the target image, artistic style of the target image, or a content guideline of the target image. Subject matter of the target image may include one or more people, animals, objects, landscapes, backgrounds, shapes, etc. that are included in the target image. Color scheme of the target image may include a palette of one or more colors used in the target image. In some aspects, color scheme may include one or more colors associated with a particular component of the subject matter (e.g., a red house). In some aspects, color scheme may include a monochromatic palette, such as black-and-white, grayscale, sepia, etc. Artistic style of the target image may include one or more various styles such as line drawing, photograph, graphic art, oil painting, etc.

Each of the foregoing image criterion (subject matter, color scheme, and artistic style) may be received as user inputs, for example from user device 117 of FIG. 1. Thus, the user (e.g., customer 101 of FIG. 1) is allowed to select and customize properties of the target image based using the at least one image criterion. In particular, the image criteria may be entered into text field 602 of user interface 600 of FIG. 6.

In some aspects, the at least one image criterion may further include non-user input criteria, such as a content guideline of the image. Non-user input criteria includes one or more image criteria that the user is not permitted to select, deviate from, override, etc. For example, the content guideline may include restrictions to the target image that prohibit the use of subject matter that may be considered profane, offensive, threatening, or otherwise ill-suited for public display.

After the image criteria have been received, the image criteria are transmitted as inputs to an artificial intelligence engine, e.g., to input module 310 of architecture 300 of FIG. 3. Transmission of the image criteria may be initiated by the users selecting command element 604 of user interface 600 of FIG. 6.

With continued reference to FIG. 4, method 400 includes, at step 404, receiving a plurality of preliminary images generated by an artificial intelligence engine (e.g., artificial intelligence module 320 of FIG. 3) based on the at least one image criterion received at step 402. Each of the plurality of preliminary images may satisfy all of the at least one image criterion of step 402. For example, if the image criteria includes subject matter of "beach" and "sunrise", all of the preliminary images include a beach and a sunrise. Similarly, if the image criteria includes an artistic style of oil painting, all of the preliminary images are prepared in the style of an oil painting. Similarly, all of the preliminary images lack content prohibited by the content guideline(s).

Each of the preliminary images is uniquely generated for the purposes of method 400. That is, the preliminary images are not (or do not include) stock images. Further, each of the preliminary images may be unique to a particular iteration of method 400. That is, the preliminary images generated at step 404 will not be reproducible during another iteration of method 400.

The preliminary images generated by the artificial intelligence engine, e.g., the images 350 of FIG. 3, are transmitted to user device 117 for display to customer 101. The preliminary images are displayed, for example, as images 622, 624 of user interface 620 of FIG. 7.

With continued reference to FIG. 4, method 400 includes, at step 406, receiving an image selection by the user (e.g. customer 101 of FIG. 1). The image selection includes an image selected from the plurality of preliminary images. The image selection may correspond to one of images 622, 624 displayed on user interface 620 of FIG. 7. In particular, the user (e.g. customer 101 of FIG. 1) may select a preferred image from among images 622, 624.

Figure 8:
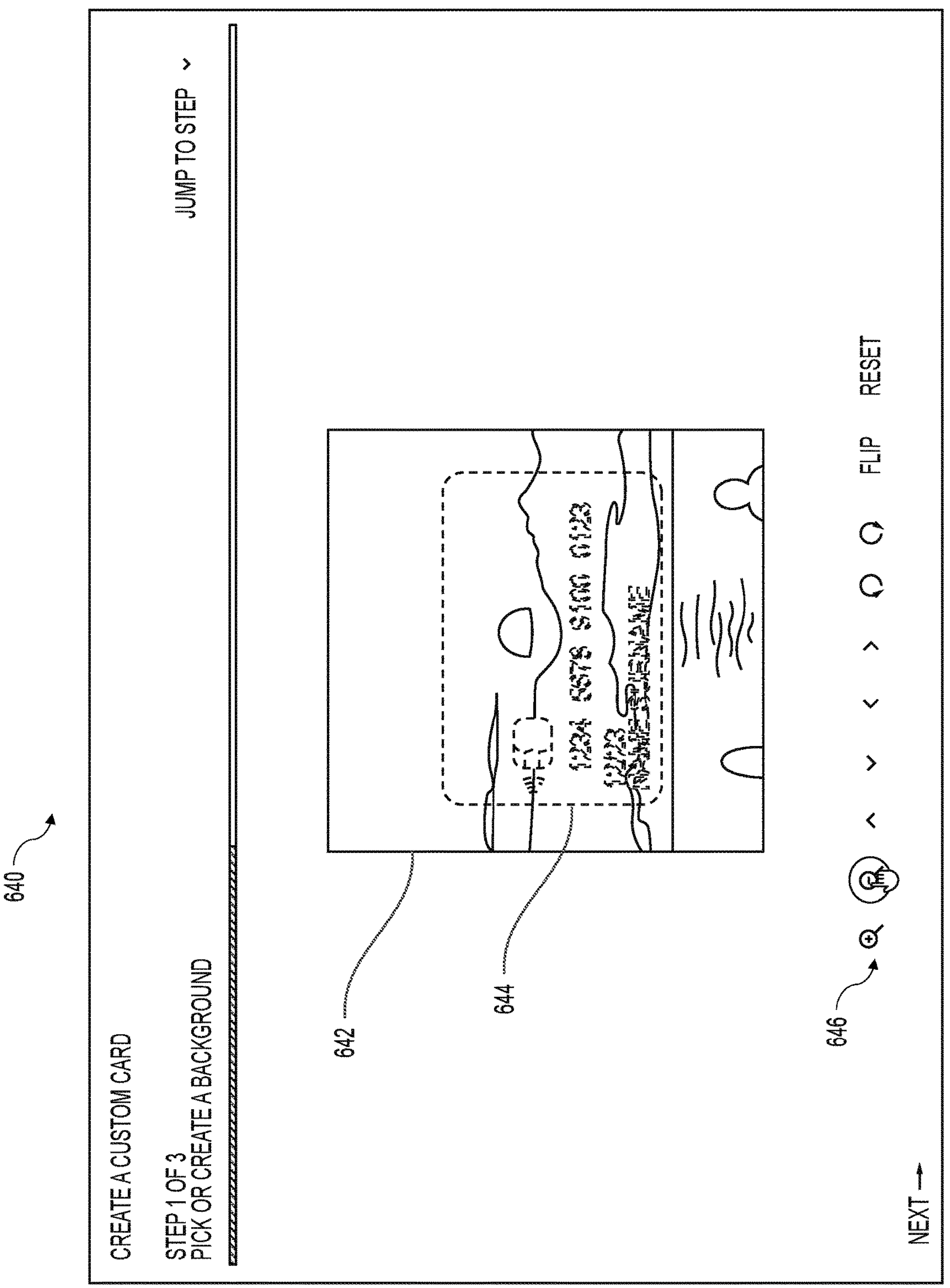
FIG. 8 depicts a user interface for generating an image for a payment device, according to one or more embodiments.

With continued reference to FIG. 4, method 400 includes, at step 408, displaying the selected image superimposed on a virtual representation of the payment card. As shown in FIGS. 8, selected image 642 is superimposed onto virtual representation of the payment card 644. Selected image 642 may be arranged to entirely cover virtual representation of payment card 644. Selected image 642 may be larger that virtual representation of payment card 644 to allow for adjustment of selected image 642 with respect to virtual representation of payment card 644, as will be described herein.

With continued reference to FIG. 4, method 400 includes, at step 410, setting at least one dimensional parameter of the selected image to suit a size of the payment card. The at least one dimensional parameter may include, for example, a resolution of the selected image, a size of the selected image, and an orientation of the selected image. Setting of the dimensional parameter may ensure that the selected image is of sufficient size to cover a designated area of the payment card, such as the entirety of the payment device. Additionally or alternatively, setting of the dimensional parameter may ensure that the resolution of the selected image is clear when adjusted to an appropriate size for the payment card. Further, setting of the dimensional parameter may ensure particular portions of the image overlay the payment card.

For example, selected image 642 may be set so that the sun is located at a central focal point of virtual representation of payment card 644, as shown in FIG. 8.

Figure 5:
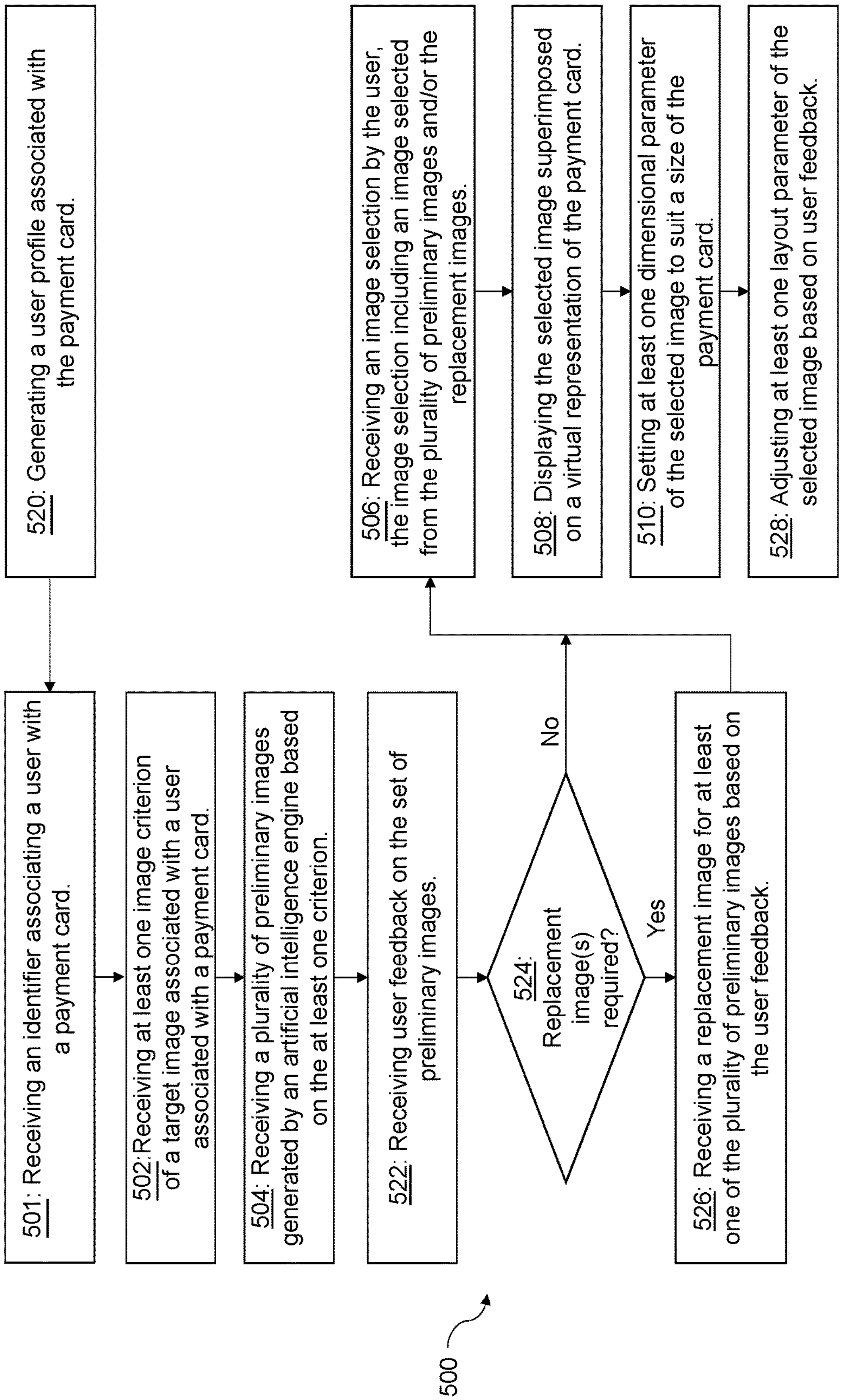
FIG. 5 illustrates a flowchart of another exemplary method for generating an image for a payment device, according to one or more embodiments.

Referring now to FIG. 5, illustrated is a flow diagram of another method 500 for generating an image for a payment device, such as payment vehicle 103 of FIG. 1 and/or payment device 200 of FIG. 2. Each of steps 502-528 of method 500 may be performed automatically by at least one processor, such as included in controller 1100 (see FIG. 11) associated with image generating system 115 and/or user device 117. Various steps 502-528 of method 500 may include, or be performed in conjunction with, display of one or more user interfaces on the user device 117. Accordingly, throughout the following description of method 500, reference is made to user interfaces 600, 620, 640, 660, 680 of FIGS. 6-10.

With continued reference to FIG. 5, method 500 includes, at step 501, receiving an identifier associating a user (e.g., customer 101 of FIG. 1) with a payment card. Method 500 further includes, at step 502, receiving at least one image criterion of a target image associated with a user (e.g., customer 101 of FIG. 1) associated with a payment card. Method 500 further includes, at step 504, receiving a plurality of preliminary images generated by an artificial intelligence engine. Steps 501, 502, and 504 may substantially correspond to steps 401, 402, and 404, respectively, of method 400 of FIG. 4.

With continued reference to FIG. 5, step 502 may be preceded by step 520, which includes generating a user profile associated with the payment card. The user profile may be associated with customer 101 of FIG. 1, and may allow customer 101 to access image generating system 115. Generating the user profile may be performed subsequently to customer 101 being approved for a line of credit by issuer 105. For example, generating the user profile may be performed during a setup process for payment vehicle 103.

With continued reference to FIG. 5, method 500 may further include, at step 522, receiving user feedback on the set of preliminary images received at step 504. User feedback indicates whether the user (e.g., customer 101 of FIG. 1) would like to replace any or all of the preliminary images with new images. At step 524, if the user does not request new images, method 500 proceeds to step 506 of receiving an image selection by the user. The image selection includes an image selected from the plurality of preliminary images. Step 506 may substantially correspond to step 406 of method 400.

At step 524, if the user requests one or more new images, method 500 proceeds to step 526 of receiving a replacement image for at least one of the plurality of preliminary images based on the user feedback of step 522. In some embodiments, receiving the replacement images at step 526 may be similar to receiving the preliminary images at step 504. In particular, the at least one image criterion received at step 502 are sent as inputs to an artificial intelligence engine (e.g., artificial intelligence module 302 of FIG. 3), which in turn generates the replacement images. In some embodiments, the user may revise or modify the at least one image criterion (e.g., by modifying the text in field 602 of user interface 620 of FIG. 6) in order to prompt the artificial intelligence engine to generate images with refined subject matter, color scheme, artistic style, etc. relative to the preliminary images received at step 504.

Method 500 then proceeds to step 506. In this instance, the selected image of step 506 may be one of the preliminary images received at step 504 or one of the replacement images received at step 526.

With continued reference to FIG. 5, method 500 may further include, at step 508, displaying the selected image superimposed on a virtual representation of the payment card. Method 500 may further include, at step 510, setting at least one dimensional parameter of the selected image to suit a size of the payment card. Steps 508 and 510 may substantially correspond to steps 408 and 410, respectively, of method 400.

With continued reference to FIG. 5, method 500 may further include, at step 528, adjusting at least one layout parameter of the selected image based on user feedback. The at least one layout parameter may include, for example, a position of the target image relative to the payment card, a zoom level of the target image, or the like. In some embodiments, the user (e.g., customer 101) may provide user feedback via one or more image manipulation commands 646 of user interface 640 of FIG. 8 (and/or like image manipulation commands 666 of user interface 660 of FIG. 9). Image manipulation commands 646 may include, for example, one or more zoom commands that shrink or enlarge selected image 642 with respect to virtual representation of payment card 644; one or more positional commands that move selected image 642 with respect to virtual representation of payment card 644; one or more rotational commands that rotate selected image 642 with respect to virtual representation of payment card 644; one or more flip commands that flip (i.e., mirror) selected image 642 with respect to virtual representation of payment card 644; and a reset command that returns selected image 642 to a default position and/or orientation with respect to virtual representation of payment card 644.

As noted above, FIGS. 6-10 depict a series of user interfaces 600, 620, 640, 660, 680 displayed on a device (e.g., user device 117 of FIG. 1) during generation of payment device 200 of FIG. 2. User interfaces 600, 620, 640, 660, 680 may be accessed, for example, from an online portal associated with an issuer (e.g., issuer 105 of FIG. 1) of payment device. In some aspects, user interfaces 600, 620, 640, 660, 680 may be accessible by a user after the user has applied for and been accepted for a line or credit by the issuer, for example during an account setup procedure.

Figure 6:
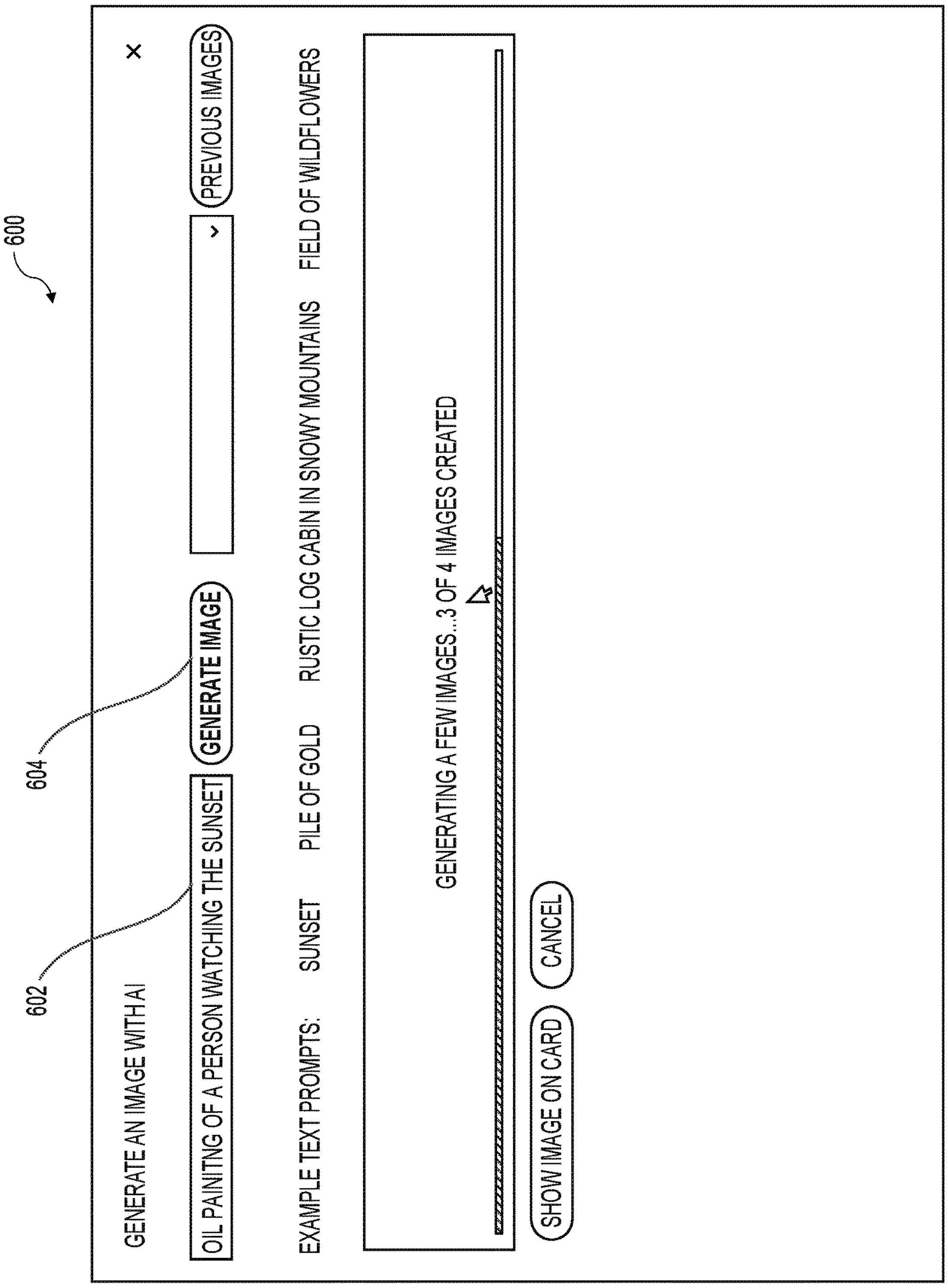
FIG. 6 depicts a user interface for generating an image for a payment device, according to one or more embodiments.

Referring specifically to FIG. 6, field 602 may be an unstructured text field in which the user can input natural language text, e.g. "oil painting of a person watching the sunset." In other embodiments, field 602 may include a drop down box or other structured input to facilitate entry of the at least one image criteria. In the illustrated example, all of the criteria provided by the user are entered into the same field 602. For example, the user may enter subject matter, color scheme, and artistic style into field 602 as part of the same text string. In the illustrated example, field 602 includes subject matter ("person watching the sunset") and artistic style ("oil painting"). In the case of the at least one image criterion being entered as an unstructured text string, user device and/or artificial intelligence engine may parse the unstructured text to identify the specific properties of the at least one image criterion (e.g., subject matter, color scheme, artistic style). In some embodiments, field 602 may include a speech-to-text function that generates the text input from speech of the user (e.g., the user may dictate "person watching the sunset" into a microphone associated with user device 117, and a processor may generate the equivalent text string for field 602).

With continued reference to FIG. 6, user interface 600 may further include command element 604 (e.g., a button)

to initiate transmission of input from field 602 to an artificial intelligence engine, e.g., artificial intelligence module 320 of FIG. 3.

Figure 7:
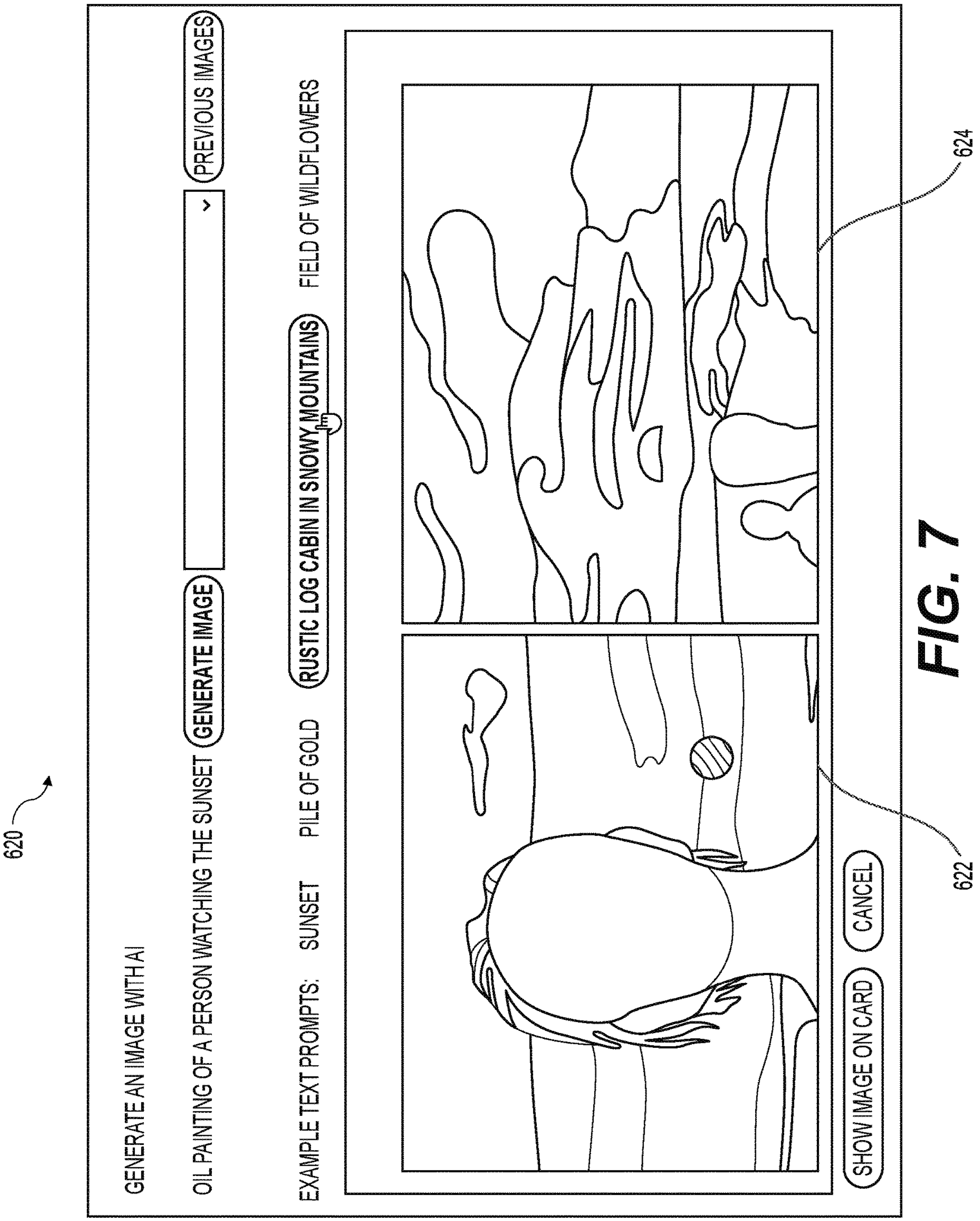
FIG. 7 depicts a user interface for generating an image for a payment device, according to one or more embodiments.

Referring now to FIG. 7, images 622, 624 of user interface 620 may represent all or a portion of the preliminary images received at step 404 of method 400. In some embodiments, user interface 620 may be scrollable to show additional images from the set of preliminary images received at step 404 of method 400.

Referring now to FIG. 8, selected image 642 is shown superimposed on virtual representation of payment card 644. As is evident, selected image 642 may be larger than payment card to allow for automatic and/or manual repositioning. A processor (e.g. a processor of controller 1100 of FIG. 11) automatically sets a default position of selected image 642 relative to virtual representation of payment card 644, as described in step 410 of method 400. The default position may be determined such that particular subject matter of selected images 642 is prominent and unobstructed by indicia of the payment card (e.g., customer name, account number, chip, etc.).

Figure 9:
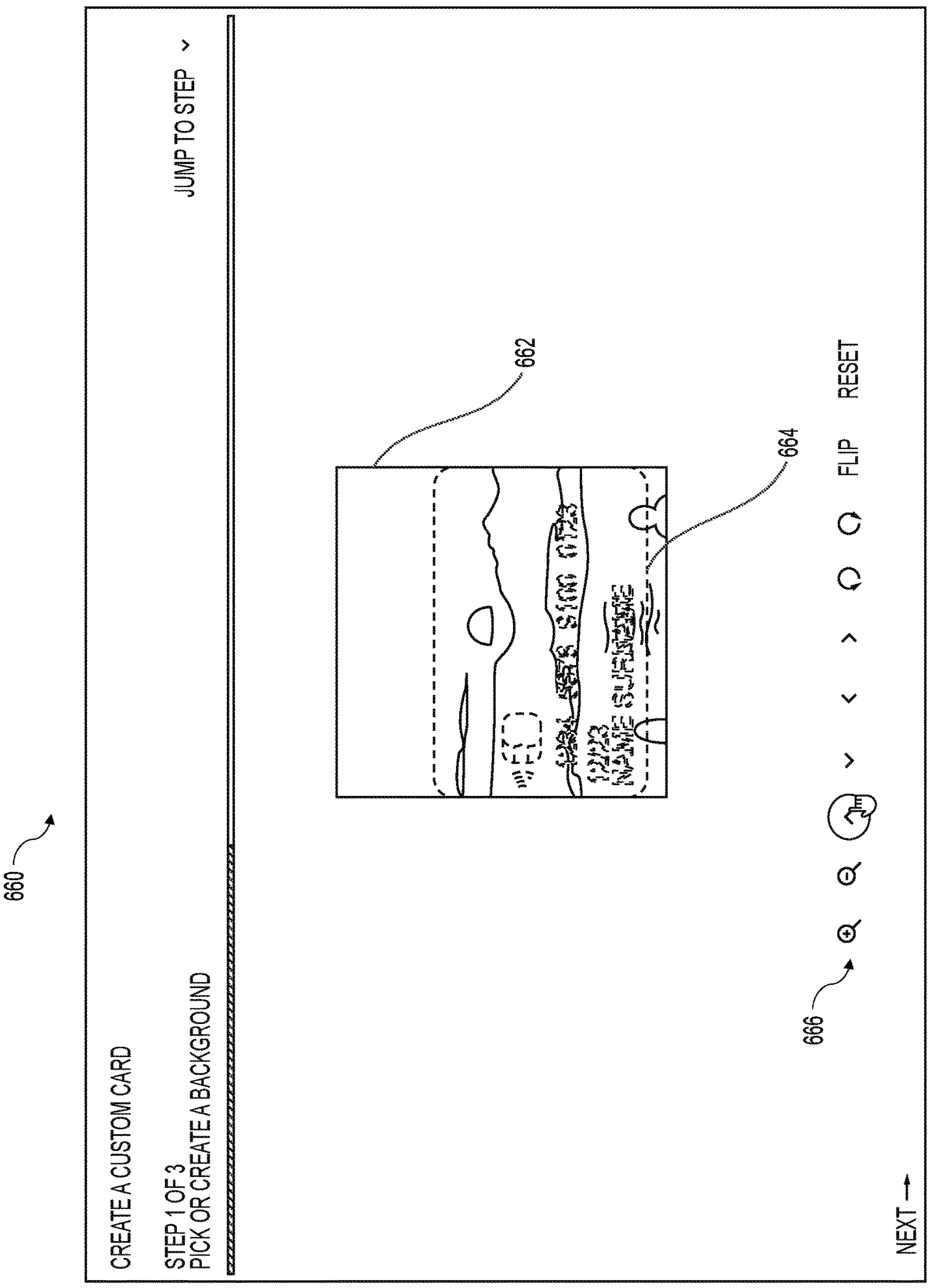
FIG. 9 depicts a user interface for generating an image for a payment device, according to one or more embodiments.

Referring now to FIG. 9, selected image 662 is shown superimposed on virtual representation of payment card 664 after user manipulation of the image layout has been performed, as described in step 528 of method 500. In particular, selected image 662 has been zoomed out relative to selected image 642 of FIG. 8, causing more of selected image to fall within the bounds of payment card.

Figure 10:
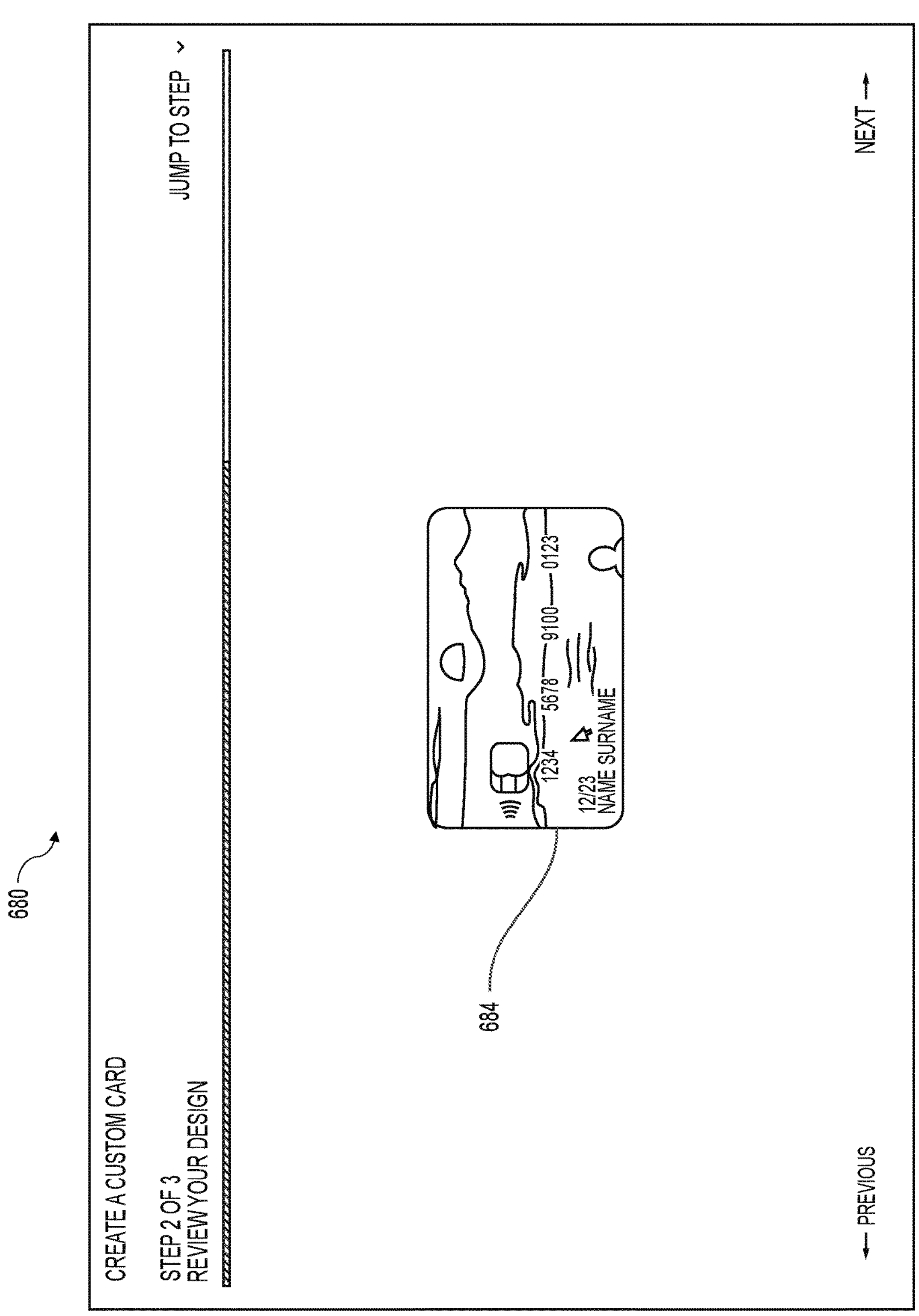
FIG. 10 depicts a user interface for generating an image for a payment device, according to one or more embodiments.

User interface 680 of FIG. 10 shows a finalized version of how payment card will appear when printed, with the selected image cropped to the size of virtual representation of payment card 684.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 11:
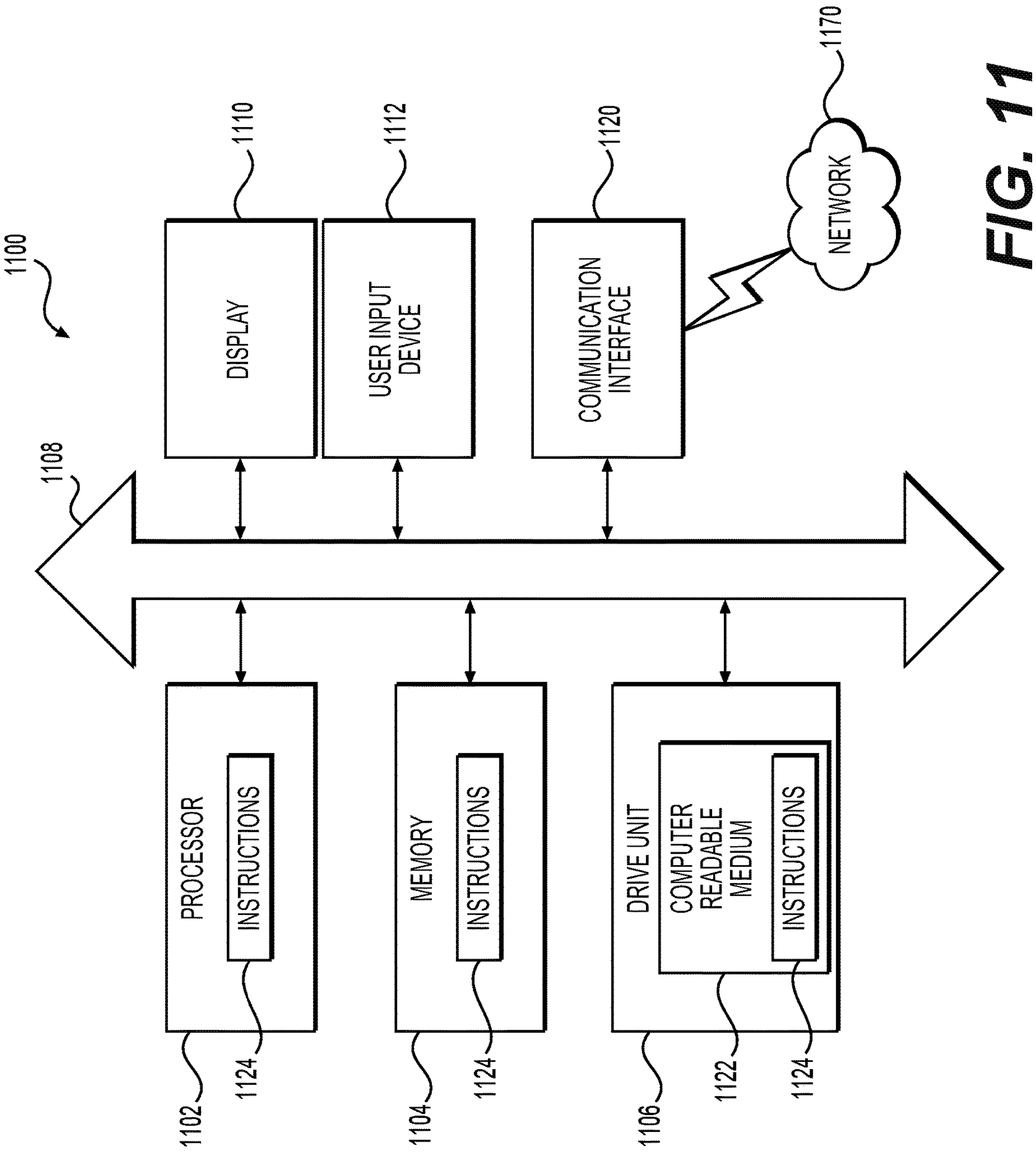
FIG. 11 illustrates a computer system for executing the techniques described herein, according to one or more embodiments.

FIG. 11 illustrates a controller 1100 for use in a device (e.g., image generating system 115 and/or user device 117 of FIG. 1). Controller 1100 can include a set of instructions that can be executed to cause controller 1100 to perform any one or more of the methods or computer based functions disclosed herein. Controller 1100 may operate as a standalone device or may be connected, e.g., using a network, to other computer systems or peripheral devices.

In a networked deployment, controller 1100 may operate in the capacity of a server or as a client user computer in a server-client user network environment, or as a peer computer system in a peer-to-peer (or distributed) network environment. Controller 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, controller 1100 can be implemented using electronic devices that provide voice, video, or data communication. Further, while a single controller 1100 is illustrated, the term "controller" shall also be taken to include any collection of systems or sub-systems that individually or jointly execute a set, or multiple sets, of instructions to perform one or more computer functions.

As illustrated in FIG. 11, controller 1100 may include a processor 1102, e.g., a central processing unit (CPU), a graphics processing unit (GPU), or both. The processor 1102 may be a component in a variety of systems. For example, the processor 1102 may be part of a standard personal computer or a workstation. The processor 1102 may be one or more general processors, digital signal processors, application specific integrated circuits, field programmable gate arrays, servers, networks, digital circuits, analog circuits, combinations thereof, or other now known or later developed devices for analyzing and processing data. The processor 1102 may implement a software program, such as code generated manually (i.e., programmed).

Controller 1100 may include a memory 1104 that can communicate via a bus 1108. The memory 1104 may be a main memory, a static memory, or a dynamic memory. The memory 1104 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1104 includes a cache or random-access memory for the processor 1102. In alternative implementations, the memory 1104 is separate from the processor 1102, such as a cache memory of a processor, the system memory, or other memory. The memory 1104 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1104 is operable to store instructions executable by the processor 1102. The functions, acts or tasks illustrated in the figures or described herein may be performed by the programmed processor 1102 executing the instructions stored in the memory 1104. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel payment and the like.

As shown, controller 1100 may further include a display unit 1110, such as a liquid crystal display (LCD), an organic light emitting diode (OLED), a flat panel display, a solid-state display, a cathode ray tube (CRT), a projector, a printer or other now known or later developed display device for outputting determined information. The display 1110 may act as an interface for the user to see the functioning of the processor 1102, or specifically as an interface with the software stored in the memory 1104 or in the drive unit 1106.

Additionally or alternatively, controller 1100 may include an input device 1112 configured to allow a user to interact with any of the components of controller 1100. The input device 1112 may be a number pad, a keyboard, or a cursor control device, such as a mouse, or a joystick, touch screen display, remote control, or any other device operative to interact with controller 1100.

Controller 1100 may also or alternatively include a disk or optical drive unit 1106. The disk drive unit 1106 may include a computer-readable medium 1122 in which one or more sets of instructions 1124, e.g., software, can be embedded. Further, the instructions 1124 may embody one or more of the methods or logic as described herein. The instructions 1124 may reside completely or partially within the memory 1104 and/or within the processor 1102 during execution by controller 1100. The memory 1104 and the processor 1102 also may include computer-readable media as discussed above.

In some systems, a computer-readable medium 1122 includes instructions 1124 or receives and executes instructions 1124 responsive to a propagated signal so that a device connected to a network 1170 can communicate voice, video, audio, images, or any other data over the network 1170. Further, the instructions 1124 may be transmitted or received over the network 1170 via a communication port or interface 1120, and/or using a bus 1108. The communication port or interface 1120 may be a part of the processor 1102 or may be a separate component. The communication port 1120 may be created in software or may be a physical connection in hardware. The communication port 1120 may be configured to connect with a network 1170, external media, the display 1110, or any other components in controller 1100, or combinations thereof. The connection with the network 1170 may be a physical connection, such as a wired Ethernet connection or may be established wirelessly as discussed below. Likewise, the additional connections with other components of the controller 1100 may be physical connections or may be established wirelessly. The network 1170 may alternatively be directly connected to the bus 1108.

While the computer-readable medium 1122 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 1122 may be non-transitory, and may be tangible.

The computer-readable medium 1122 can include a solid-state memory such as a memory card or other package that houses one or more non-volatile read-only memories. The computer-readable medium 1122 can be a random-access memory or other volatile re-writable memory. Additionally or alternatively, the computer-readable medium 1122 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Controller 1100 may be connected to one or more networks 1170. The network 1170 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 1170 may include wide area networks (WAN), such as the Internet, local area networks (LAN), campus area networks, metropolitan area networks, a direct connection such as through a Universal Serial Bus (USB) port, or any other networks that may allow for data communication. The network 1170 may be configured to couple one computing device to another computing device to enable communication of data between the devices. The network 1170 may generally be enabled to employ any form of machine-readable media for communicating information from one device to another. The network 1170 may include communication methods by which information may travel between computing devices. The network 1170 may be divided into sub-networks. The sub-networks may allow access to all of the other components connected thereto or the sub-networks may restrict access between the components. The network 1170 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method for generating a user-designed image for applying to a payment card, the method comprising:

receiving, by at least one processor, at least one image criterion of a target image associated with a user associated with a payment card, the image criterion being received as a text field indicating at least two properties of the image;

receiving, by at least one processor, a plurality of preliminary images generated by an artificial intelligence engine based on the at least one image criterion, wherein each of the images includes at least one element corresponding to each of the properties;

receiving, by at least one processor, an image selection by the user, the image selection including an image selected from the plurality of preliminary images;

displaying, by at least one processor on a user interface, an outline of the selected image superimposed on an outline of a virtual representation of the payment card, wherein the virtual representation of the payment card includes a visual indication of a customer name, an account number, or a chip, wherein the outline of the selected image is larger than the outline of the virtual representation of the payment card, and wherein the at least one processor initially superimposes the selected image on the virtual representation of the payment card such that at least one of the elements of the selected image corresponding to at least one of the properties is positioned i) at a central focal point of the virtual representation of the payment card and ii) unobstructed by the visual indication of the customer name, account number, or chip; and setting, by at least one processor, at least one dimensional parameter of the selected image to suit a size of the payment card.

2. The method of claim 1, wherein the at least one image criterion comprises at least one of:

subject matter of the target image;

color scheme of the target image;

artistic style of the target image; or a content guideline of the image.

3. The method of claim 1, wherein the at least one dimensional parameter comprises at least one of:

a resolution of the selected image;

a size of the selected image; or an orientation of the target image.

4. The method of claim 1, further comprising:

receiving, by at least one processor, user feedback as a received text field, the feedback including a prompt with a request to generate images with refined subject matter, color scheme, or artistic style relative to the set of preliminary images; and receiving, by at least one processor, a replacement image for at least one of the plurality of preliminary images based on the user feedback.

5. The method of claim 1, further comprising, adjusting, by the at least one processor, at least one layout parameter of the selected image in response to user feedback, the user feedback being entered by modifying a text field received by the at least one processor, wherein the at least one layout parameter comprises at least one of:

a position of the target image relative to the payment card; or a zoom level of the target image.

6. The method of claim 1, wherein each of the plurality of preliminary images is uniquely generated by the artificial intelligence engine.

7. The method of claim 1, further comprising:

generating, by at least one processor prior to receiving the at least one image criterion, a user profile associated with the payment card.

8. A computer system for generating a user-designed image for applying to a payment card, the computer system comprising:

at least one memory having processor-readable instructions stored therein; and at least one processor configured to access the memory and execute the processor-readable instructions, which when executed by the processor configure the processor to perform a plurality of functions, including functions for:

receiving at least one image criterion of a target image, the image criterion being received as a text field indicating at least two properties of the image;

receiving a plurality of preliminary images generated by an artificial intelligence engine based on the at least one image criterion, wherein each of the images includes at least one element corresponding to each of the properties;

receiving an image selection including a selected image from the plurality of preliminary images;

displaying, on a user interface, an outline of the selected image superimposed on a virtual representation of the payment card, wherein the virtual representation of the payment card includes a visual indication of a customer name, an account number, or a chip, wherein the outline of the selected image is larger than the outline of the virtual representation of the payment card, and wherein the at least one processor initially superimposes the selected image on the virtual representation of the payment card such that at least one of the elements of the selected image corresponding to at least one of the properties is positioned i) at a central focal point of the virtual representation of the payment card and ii) unobstructed by the visual indication of the customer name, account number, or chip; and setting at least one dimensional parameter of the selected image to suit a size of the payment card.

9. The system of claim 8, wherein the at least one image criterion comprises at least one of:

subject matter of the target image;
color scheme of the target image;
artistic style of the target image; or
a content guideline of the image.

10. The system of claim 8, wherein the at least one dimensional parameter comprises at least one of:

a resolution of the selected image;
a size of the selected image; or
an orientation of the target image.

11. The system of claim 8, wherein the plurality of functions includes functions for:

receiving user feedback as a received text field, the feedback including a prompt with a request to generate images with refined subject matter, color scheme, or artistic style relative to the set of preliminary images; and receiving a replacement image for at least one of the plurality of preliminary images based on the user feedback.

12. The system of claim 8, wherein the plurality of functions includes a function for adjusting at least one layout parameter of the selected image in response to user feedback, the user feedback being entered by modifying a text field received by the at least one processor, and wherein the at least one layout parameter comprises at least one of:

a position of the target image relative to the payment card; or a zoom level of the target image.

13. The system of claim 8, wherein each of the plurality of preliminary images is uniquely generated by the artificial intelligence engine.

14. The system of claim 8, wherein the plurality of functions includes a function for generating, by at least one processor prior to receiving the at least one image criterion, a user profile associated with the payment card.

15. A non-transitory computer-readable medium containing instructions for generating a user-designed image for applying to a payment card, the non-transitory computer-readable medium storing instructions that, when executed by at least one processor, configure the at least one processor to perform:

receiving at least one image criterion of a target image associated with a user associated with a payment card, the image criterion being received as a text field indicating at least two properties of the image;

receiving a plurality of preliminary images generated by an artificial intelligence engine based on the at least one image criterion, wherein each of the images includes at least one element corresponding to each of the properties;

receiving an image selection by the user, the image selection including an image selected from the plurality of preliminary images;

displaying, on a user interface, an outline of the selected image superimposed on a virtual representation of the payment card, wherein the virtual representation of the payment card includes a visual indication of a customer name, an account number, or a chip, wherein the outline of the selected image is larger than the outline of the virtual representation of the payment card, and wherein the at least one processor initially superimposes the selected image on the virtual representation of the payment card such that at least one of the elements of the selected image corresponding to at least one of the properties is positioned i) at a central focal point of the virtual representation of the payment card and ii) unobstructed by the visual indication of the customer name, account number, or chip; and setting at least one dimensional parameter of the selected image to suit a size of the payment card.

16. The non-transitory computer-readable medium of claim 15, wherein the at least one image criterion comprises at least one of:

subject matter of the target image;
color scheme of the target image;
artistic style of the target image; or
a content guideline of the image.

17. The non-transitory computer-readable medium of claim 15, wherein the at least one dimensional parameter comprises at least one of:

a resolution of the selected image;
a size of the selected image; or
an orientation of the target image.

18. The non-transitory computer-readable medium of claim 15, wherein the instructions configure the at least one processor to perform:

receiving user feedback as a received text field, the feedback including a prompt with a request to generate images with refined subject matter, color scheme, or artistic style relative to the set of preliminary images; and receiving a replacement image for at least one of the plurality of preliminary images based on the user feedback.

19. The non-transitory computer-readable medium of claim 15, wherein the instructions configure the at least one processor to perform adjusting at least one layout parameter of the selected image in response to user feedback, the user feedback being entered by modifying a text field received by the at least one processor, and wherein the at least one layout parameter comprises at least one of:

a position of the target image relative to the payment card; or a zoom level of the target image.

20. The non-transitory computer-readable medium of claim 15, wherein each of the plurality of preliminary images is uniquely generated by the artificial intelligence engine.

* * * * *